July 9, 1957 C. R. ANDERSON 2,798,286
METAL WORKING OPERATIONS
Filed April 12, 1956
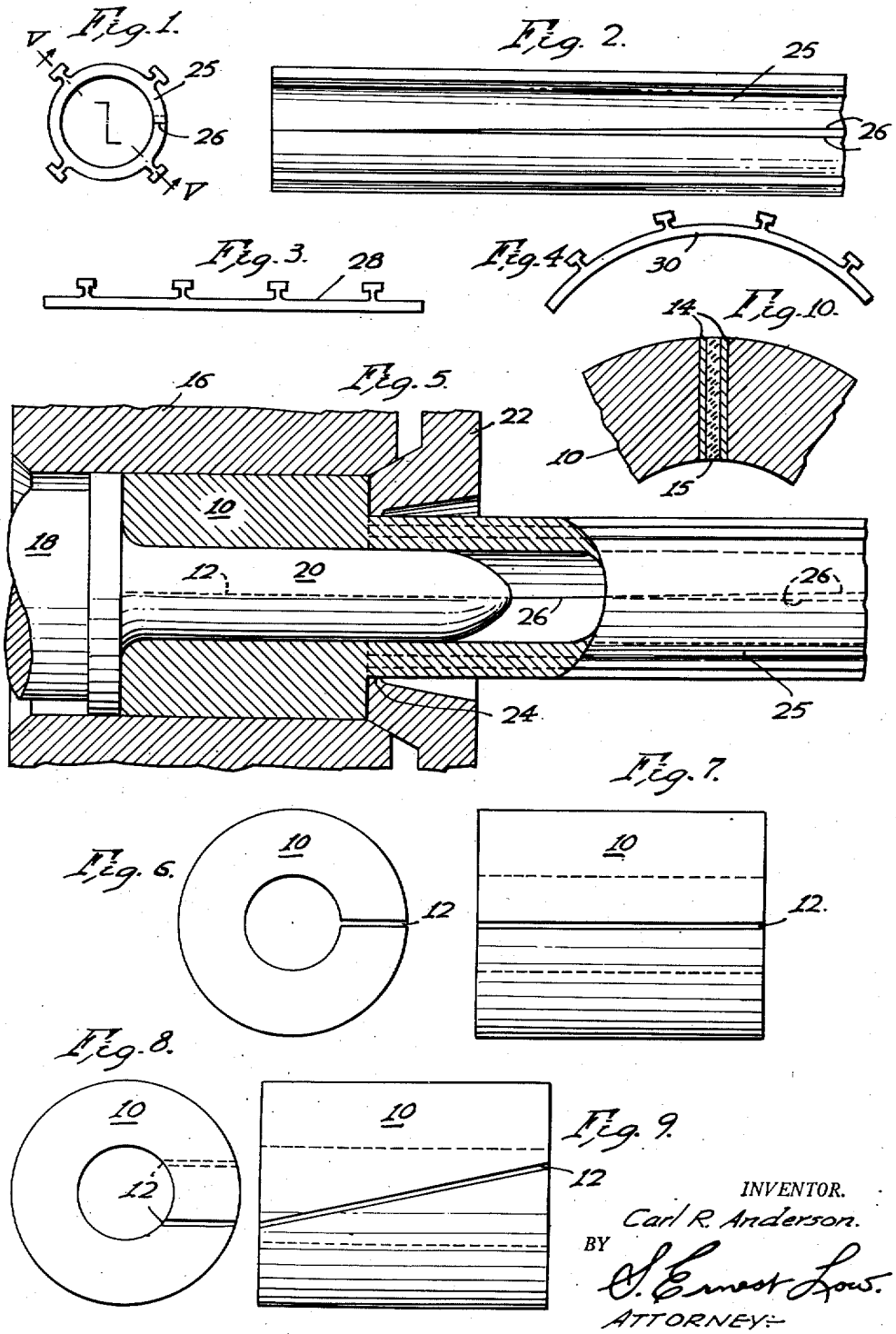
INVENTOR.
Carl R. Anderson.
BY
S. Ernest Low.
ATTORNEY:-

United States Patent Office 2,798,286
Patented July 9, 1957

2,798,286

METAL WORKING OPERATIONS

Carl R. Anderson, Lafayette, Ind., assignor to Aluminum Company of America, Pittsburgh, Pa., a corporation of Pennsylvania Application April 12, 1956, Serial No. 577,889

8 Claims. (Cl. 29—423)

This invention relates to the art of metal working and is more specifically directed to metal fabrication involving an extrusion step. This application is a continuation-in-part of my allowed application, Serial No. 297,292, filed March 29, 1952, now abandoned.

It is a well-known extrusion practice to produce tubular shapes or sections which are subsequently split or severed through a wall thereof to permit transformation of the section to other than tubular shape or section, such as a flat or curvilinear plate section. This known practice is described in United States Letters Patent 2,458,686, issued January 11, 1949, to Robert P. Davie, Jr.

The present invention has for its main object the provision of a metal working process in which an initially prepared extrusion billet is subject to an extrusion step to produce a substantially tubular shape or section which is discontinuous in its perimeter or periphery, and which can be transformed if desired to other than its extruded tubular shape or section without the necessity of a mechanical splitting or severing step.

Other objects and advantages of the invention will present themselves, to those skilled in the art to which the present invention appertains, from consideration of the following specification and accompanying drawing in which:

Fig. 1 represents an end elevational view of a structural member extruded in accordance with the teaching of the present invention;

Fig. 2 represents a side elevational view of the structural member illustrated in Fig. 1;

Fig. 3 represents an end elevational view of a flat plate-like member resulting from the transformation by flattening of the member of Figs. 1 and 2;

Fig. 4 represents an end elevational view of a curvilinear plate-like member resulting from the transformation of the member of Figs. 1 and 2;

Fig. 5 represents a fragmentary, partial sectional view on the plane V—V of Fig. 1 through an extrusion mechanism and illustrating the step of extruding the section of Figs. 1 and 2;

Fig. 6 represents an end elevational view of a tubular metal extrusion billet;

Fig. 7 represents a side elevational view of the billet of Fig. 6;

Fig. 8 represents an end elevational view of a modification of the tubular metal extrusion billet of Figs. 6 and 7;

Fig. 9 represents a side elevational view of the billet of Fig. 8; and

Fig. 10 represents a sectional view to enlarged scale of a fragment of an extrusion billet prepared in accordance with one embodiment of the invention, and prior to its extrusion.

Practice of the invention is generally applicable to the manufacture of metallic structural members that are difficult, if not impossible, to produce in normally available structural shape rolling equipment. An example of a structural section, which is readily fabricated under the teachings of the present invention is a flat or curvilinear plate member having substantially greater length than width, and which is preferably provided with one or more integrally formed, outwardly extending surface ribs running lengthwise of the section in parallelism with a marginal edge thereof. The rib or ribs may also be of such cross sectional configuration, such as a T or similar flanged formation, that an obstacle to efficient and permissible roll design would present itself in the event attempts were made to employ available and known technique and equipment.

In general terms, the present invention is directed to metal fabrication processes involving an extrusion step, with or without a subsequent metal transformation step. In a preferred practice of the invention, a desired structural member is first extruded in substantially tubular form and is thereafter transformed by further mechanical working to a shape or section other than its initial extruded form. The final shape or cross sectional form of the selected structural member so produced does not normally represent a change in the cross sectional area or mass of the initially extruded shape or section, the transformation therefrom being definable in terms of a redistribution or transformation of the mass of the section in respect to a reference plane outside the cross sectional area of the initially extruded section, as distinguished from redistribution or transformation of the mass of the initially extruded section within its confining or peripheral boundaries.

The invention is not associated with, or confinable to any particular class of metals or metallic alloys and may be practiced with equally good results in the ferrous and non-ferrous fields. It is a significant feature or step of the present invention that the selected structural member be initially fabricated in substantially tubular form by an extrusion step which provides less than a mechanical bond in a wall thereof, the defined bond running axially of the length to permit the aforedescribed redistribution or transformation of the mass of the section in the absence of a severing or similar cutting operation. This result is accomplished through a novel pretreatment of the selected extrusion billet from which the extruded section is produced.

In general, the extrusion billet may be a cast, rolled or forged member of generally one-piece integral tubular or hollow cross section and is preferably provided in the form of a hollow right cylinder. The billet is severed longitudinally through a wall thereof, and the adjacent surfaces of the severed wall separated by a material, substance or compound that serves to eliminate and prevent the formation of a metallurgical bond and/or mechanical anchorage between the severed wall surfaces under the pressures and temperatures experienced and reached during the extrusion of the selected billet.

Two general classes of separating material, or combinations thereof, have been found satisfactory in fulfilling the requirements of a metallurgical bond- and anchorage-preventing condition in the billet and extruded section. One class of separating materials or compounds is definable in terms of an artificially produced, relatively adherent coating on at least one adjacent surface of the severed wall of the initially severed billet, characterized by being non-metallic and including a reaction product of the metal or alloy of the selected extrusion billet. The second general class of separating compounds or materials is definable in terms of non-metallic lubricants that retain their stability of composition under the pressures and temperatures of the extrusion operation. Examples of both classes of non-metallic separating materials or compounds are given hereinafter.

Referring now to the drawing, a one-piece integral billet 10 is selected in a metal or alloy composition desired in the final structural section or shape. The billet is tubular in form and is preferably a hollow right cylinder, which will adapt itself to regularly employed extrusion equipment. The wall of the billet is axially sliced, sawcut, or otherwise severed at 12, preferably over the entire length of the billet, to provide separated adjacent surfaces in an otherwise continuous enclosing wall.

It is not essential that the billet 10 be severed on a radial plane 12 extending in axial parallelism with the longitudinal axis of the billet. Figs. 8 and 9 illustrate an angularly disposed severance 12, which is not radially disposed in respect to the center of the billet 10, and which is satisfactory in the practice of the invention.

The billet 10 is now further prepared for extrusion in either of three ways. First, the adjacent surfaces of the severed wall 12 may be provided with an adherent, artificially produced non-metallic coating 14 (Fig. 10), preferably including a reaction product of the metal or alloy of the billet 10. In a second form or preparation of the billet, the adjacent surfaces of the severed wall 12 may be separated with a lubricant 15, which is preferably non-metallic in nature and characterized by its stability of composition during all temperatures employed and reached in the extrusion of the selected metal or alloy billet 10. Thirdly, the adjacent surfaces of the severed wall 12 may be treated by a combination of the first and second treatments specified above, in which case an adherent, non-metallic coating 14 and a non-metallic lubricant 15 are present as shown in Fig. 10. In any case, the billet 10 is severed through a wall thereof over its entire length and the adjacent surfaces of the severed wall are separated by either one of (1) a relatively adherent, artificially produced, non-metallic separating coating 14, (2) a non-metallic separating lubricant characterized by its stability of composition for all temperatures reached during extrusion of the billet or (3) a combination of (1) and (2), as illustrated in Fig. 10.

A billet, prepared in accordance with any one of the three treatments described above, is charged into the container 16 of an extrusion press provided with a ram 18, interior configuration controlling mandrel 20, and any extrusion die 22 provided with the usual exterior configuration controlling aperture 24. The die 22 is normally mounted in pressure resistant relationship in respect to the discharge end of the press container 16, and the ram 18 and mandrel 20 are reciprocable within the container 16 for the purpose of extruding the metal of the billet 10 through the unobstructed single die orifice formed between the internal mandrel 20 and die aperture 24.

Under the applied extrusion pressure of the ram 18, the billet 10, which is initially slightly smaller in diameter than the interior diameter of the container 16, is first axially upset to completely fill the annular space between the interior wall of the container 16 and the exterior surface of the mandrel 20. Continued applied pressure on the billet 10 through the medium of the advancing ram 18 results in the extrusion of the substantially tubular shape or section 25.

The separating material 14 and/or 15 remains between the adjacent surfaces of the severed wall 12 of the billet 10 within the extrusion container 16, and section 25 is extruded with the separating material, or materials, in reduced thickness to provide a non-metallurgically bonded wall represented by the reference numeral 26 in substantial registry in the plane of extrusion with the severed wall 12 of the initial extrusion billet 10. In actual practice it has been observed that the extruded section 25 leaves the die 22 with the discontinuous wall 26 in compressed relationship. As the extrusion progresses, the adjacent wall edges separate as indicated to best advantage in Figs. 2 and 5. Regardless of whether the wall of the extruded section 25 is closed or partially separated at 26 during or following its complete extrusion, there is less than a mechanical bond extending throughout the axial length of the final extruded section 25.

The extrusion operation is normally stopped before the entire billet 10 is extruded to thereby leave a heel within the container 16 attached to the extruded section 25. The heel usually comprises metal contaminated with oxides of the same and is normally sheared off in any suitable manner to provide the section illustrated in Figs. 1 and 2.

Section 25 may now be opened out and flattened to provide any desired distribution of its mass in respect to a reference plane lying outside the confining boundaries of the section as extruded. Flat plate 28 (Fig. 3) and curvilinear plate 30 (Fig. 4) represent two suggested transformations of the extruded section 25. The lengthwise marginal edges of the resultant structural shape or section are satisfactory for many uses in their extruded condition. If desired, the marginal edges may be machined, as in the case of a ship-lap type of joint between adjacent structural members. The sections or shapes 28 and 30 represent final extruded widths that would not be possible as solid extrusions without the use of extrusion apparatus of extremely large capacity and billet container diameter.

There are numerous well-known and tried surface preparations which can be employed to provide satisfactory artificial, adherent, separating compounds or substances 14, preferably including a reaction product of the base metal to be extruded, between the adjacent surfaces of the severed wall 12 of a billet 10 under fabrication in accordance with the teachings of the invention. Chemically or electrolytically produced oxide coatings are satisfactory in this respect and may be confined to at least one of the adjacent surfaces 12 of the initial billet 10 through the use of suitable stop-off materials applied to the remaining exposed surfaces of the billet 10. In normal practice, however, it is in the interest of economy to expose the entire billet 10 to a treatment that will insure provision of a non-metallic separating compound or substance between the adjacent surfaces of the severed billet that will insure a non-metallurgical, separable bond through the wall of the billet 10 and subsequently extruded section 25.

Most, if not all, structural metals and their alloys respond to the production of a satisfactory artificial oxide coating that serves the purpose of the present invention by heating the same in the absence of a protective atmosphere, or in a chemically controlled atmosphere. Since it is a normal practice to preheat or reheat extrusion billets prior to their extrusion, the atmosphere employed for this purpose may be controlled to produce the desired oxide coating.

Many well-known non-metallic lubricants 15 are available as substitution separating compounds between the adjacent surfaces 12 of the severed billets 10, and such lubricants may also be employed in the presence of the non-metallic separating compounds 14. Depending on the extrusion temperature and pressure employed in a particular metal or alloy, and with tin and its alloys representing the lower end and iron and its alloys the upper end of the extrusion temperature and pressure scale, non-metallic lubricants in the range of liquid hydrocarbons through graphite and other solid lubricants, such as metallic soaps, plastics, glass, slags, and the like, may be employed. When a non-metallic lubricant is employed in the practice of the invention it is the preferred practice to confine its application to the adjacent surfaces 12 of the billet 10. In the case of lower melting point non-ferrous metals and their alloys, the non-metallic lubricant is preferably applied prior to any preheating or reheating of the billet, although the lubricant may be applied at the time the billet is charged into the extrusion press. In the case of the higher melting point ferrous metals, the lubricant is preferably applied just prior to its charging into the extrusion press. For example, a glass shim would be inserted between the adjacent surfaces 12 of a ferrous billet just before charging it into the extrusion press.

Specific examples of surface preparations and/or lubricants which respond to the teachings of the present invention, in that they provide the non-metallic separating substances above referred to, are now given in terms of regularly fabricated structural metals and their alloys.

Magnesium and its alloys

An adherent, non-metallic, separating compound 14, which is suitable for the purposes of the invention, may be produced in the form of a coating including a reaction product of the metallic magnesium either by chemical or electrolytic action. A satisfactory chemical treatment comprises immersing the metal billet 10 in aqueous solutions of silicofluoric, fluosilicic, borofluoric and titanofluoric acids, or the magnesium salts of these acids.

An electrolytic treatment for the same purpose consists in making the billet anode in a heated bath containing ammonium biphosphate, sodium hydroxide, potassium hydroxide, or similar strongly alkaline baths having a pH above 12.

Non-metallic lubricant, preferably comprising a finely divided graphite-water, or other suitable liquid slurry, serves to best advantage for the lubricant 15 in the case of magnesium and its alloys.

Zinc and its alloys

The separating compound 14 in the case of zinc and its alloys may be produced anodically in an alkaline electrolyte containing a compound of an amphoteric metal having a hydroxyl concentration sufficient to yield an adherent coating on the zinc base anode, while insufficient to completely dominate the anion of the ampholyte. Substantially neutral electrolytes containing one or more compounds selected from the group comprising potassium ferrocyanide, potassium ferricyanide, potassium permanganate, potassium dichromate, ammonium molybdate and ammonium oxalate may also be employed for this purpose.

The separating compounds 14 may also be produced chemically by immersing the zinc base billets 10 in aqueous solutions containing at least one of the acids nitric, sulphuric, and hydrochloric in admixture with phosphoric acid.

Non-metallic finely divided graphite-water, or other suitable liquid slurry, satisfies the requirement of the stable lubricant 15 for zinc and its alloys.

Aluminum and its alloys

In the case of aluminum and its alloys, the adjacent, or at least one of the surfaces 12 of the severed billet 10, or the entire billet, can be economically treated in a caustic solution of the approximate composition by weight 8 to 12 percent sodium hydroxide to provide a satisfactory artificial, adherent, non-metallic separating substance 14. Other chemical treatments may be substituted for the caustic etch above described. For example, the aluminous billets may be immersed in a hot oxidizing solution containing sodium carbonate and potassium dichromate.

The separating material 14 may also be produced anodically in an aqueous electrolyte containing sulphuric, oxalic or chromic acid.

Graphite-water slurry is the preferred lubricant in the case of aluminum and its alloys.

Iron and its alloys

The separating compound 14 in the case of iron and its alloys may be readily produced by immersion in solution containing one or more of the compounds ferrous sulfate, protosulfate of iron, protochloride or perchloride of iron, sulfate or chloride of zinc, and chloride of manganese.

The non-metallic lubricant 15 should preferably be selected from the elevated temperature, non-metallic lubricants known as plastic lubricants, glass and similar lubricants of the type described in United States Letters Patent 2,538,917, issued January 23, 1951, to Jacques Sejournet et al.

Copper and its alloys

Anodic treatment of copper and its alloys is useful in providing the non-metallic separating materials 14. Electrolytes containing one or more of the carbonates of sodium, potassium, and ammonium are satisfactory for the purposes of the invention.

The separating compounds may also be produced chemically by coating at least one of the adjacent surfaces 12 of the severed billet 10 with a heavy or viscous oil solution containing a phosphate compound and carbon, and heating the billet to form an adherent, compound of the base metal of the billet.

Graphite-water slurry is preferred as the non-metallic lubricant 15 in the practice of the invention in the copper field.

Having described the invention generally, and given specific examples in its application to ferrous and non-ferrous metals and their alloys, it will be understood that a method of working metals, including the light metals aluminum and magnesium, has been fully disclosed which greatly increases the field of use of structural members capable of fabrication by extrusion. This is particularly so in the aircraft industry, as it is now possible to extrude members in substantially tubular form, characterized by having a separable bond less than a mechanical bond throughout the length of the section, in existing extrusion equipment, which method of extrusion provides a section that can be opened out into a flat or other than substantially tubular, extruded section.

The axially severed wall 12 of the initial one-piece integral billet 10 has been specifically described in terms of having been produced by a slicing or saw cutting operation. It will be understood that the axial opening 12 through the wall of the billet 10 could be produced in other well known manners, such as for example while the billet is being cast, without detracting in any way from the intended scope of the invention.

Although specific instructions and illustrations have been used in describing the present invention, it is to be understood that the invention is not to be limited except as defined in the appended claims.

What is claimed is:

1. In a metal working process, the steps comprising, selecting a one-piece integral tubular metal billet to be worked having an opening through a wall thereof over its entire length to provide separated adjacent surfaces in an otherwise continuous enclosing wall, interposing a non-metallic metallurgical bond- and anchorage-preventing material between the separated adjacent surfaces of the opening through the wall of the billet, extruding the thus prepared billet to provide a substantially tubular extruded section having less than a mechanical bond in a wall thereof in substantial registry in the plane of extrusion with the separating substance in the billet wall, and transforming the extruded section to other than tubular form with marginal longitudinal edges defined by the less than mechanically bonded portions of the as extruded section.

2. In a metal working process, the steps comprising selecting a one-piece integral tubular billet of a metal to be worked, severing through a wall of the billet over its entire length to provide separated adjacent surfaces in an otherwise continuous enclosing wall, providing a non-metallic metallurgical bond- and anchorage-preventing separating substance between the adjacent faces of the severed wall of the billet, extruding the thus prepared billet to provide a substantially tubular extruded section having less than a mechanical bond in a wall thereof in substantial registry in the plane of extrusion with the separating substance in the billet wall, and transforming the extruded section to other than tubular form with marginal longitudinal edges defined by the less than mechanically bonded portions of the as extruded section.

3. In a metal working process, the steps comprising, selecting a one-piece integral tubular billet of a metallic composition to be worked, severing through a wall of the billet over its entire length to provide separated adjacent surfaces in an otherwise continuous wall, providing a non-metallic metallurgical bond- and anchorage-preventing separating substance including a reaction product of the metal of the billet between the adjacent faces of the severed wall of the billet, extruding the thus prepared billet to provide a substantially tubular extruded section having less than a mechanical bond in a wall thereof over its entire length in substantial registry in the plane of extrusion with the separating substance in the billet wall, and transforming the extruded section to other than tubular form with separated marginal edge defined by the less than mechanically bonded portions of the extruded sections.

4. In a metal working process, the steps comprising, selecting a one-piece integral tubular billet of a metallic composition to be worked, severing through a wall of the billet over its entire length to provide separated adjacent surfaces in an otherwise continuous enclosing wall, providing a non-metallic lubricant between the adjacent faces of the severed wall of the billet, extruding the thus prepared billet to provide a substantially tubular extruded section having less than a mechanical bond in a wall thereof over its entire length in substantial registry in the plane of extrusion with the non-metallic lubricant in the billet wall, and transforming the extruded section to other than tubular form with separated marginal edges defined by the less than mechanically bonded portions of the as extruded section.

5. In a ferrous metal working process, the steps comprising, selecting a ferrous metal billet in one-piece integral tubular form, severing through a wall of the billet over its entire length to provide separated adjacent surfaces in an otherwise continuous enclosing wall, inserting a lubricant in the form of glass between the adjacent faces of the severed wall of the billet, extruding the thus prepared billet to provide an extruded section in substantially tubular form having less than a mechanical bond in a wall thereof over its entire length in substantial registry in the plane of extrusion with the severed wall of the ferrous metal billet, and transforming the extruded section to other than tubular form with separated marginal edges defined by the less than mechanically bonded portions of the as extruded section.

6. In a light metal working process, the steps comprising, selecting a light metal billet in one-piece integral tubular form, severing through a wall of the billet over its entire length to provide separated adjacent surfaces in an otherwise continuous enclosing wall, providing a separating substance in the form of a chemically produced reaction product of the light metal between the adjacent faces of the severed wall of the billet, extruding the thus prepared billet to provide an extruded section in substantially tubular form having less than a mechanical bond in a wall thereof over its entire length in substantial registry in the plane of extrusion with the severed wall of the light metal billet, and transforming the extruded section to other than tubular form with separated marginal edges defined by the less than mechanically bonded portions of the as extruded section.

7. In a light metal working process, the steps comprising, selecting a light metal billet in one-piece integral tubular form, severing through a wall of the billet over its entire length to provide separated adjacent surfaces in an otherwise continuous enclosing wall, supplying a separating substance in the form of an adherent, chemically produced reaction product of the light metal on at least one adjacent face of the severed wall of the billet, applying graphite to the other adjacent face of the severed billet, extruding the thus prepared billet to provide an extruded section in substantially tubular form having less than a mechanical bond in a wall thereof over its entire length in substantial registry in the plane of extrusion with the severed wall of the light metal billet, and transforming the extruded section to other than tubular form with separated marginal edges defined by the less than mechanically bonded portions of the as extruded section.

8. A metal working process comprising the steps, selecting a one-piece integral tubular billet of a metallic composition to be worked, severing through a wall of said billet over its entire length on a radial plane extending axially parallel to the longitudinal axis of the billet to provide separated adjacent surfaces in an otherwise continuous enclosing wall, applying a non-metallic lubricant between the adjacent faces of the severed wall of the billet, extruding the thus prepared billet to provide a substantially tubular extruded section having less than mechanical anchorage in a wall thereof over its entire length in substantial registry in the plane of extrusion with the non-metallic lubricant in the billet wall, and transforming the extruded section to other than tubular form with separated marginal edges defined by the less than mechanically anchored portions of the as extruded section.

References Cited in the file of this patent
UNITED STATES PATENTS

| | | |
|---|---|---|
| 2,458,686 | Davie | Jan. 11, 1949 |
| 2,628,417 | Peyches | Feb. 17, 1953 |

UNITED STATES PATENT OFFICE

CERTIFICATE OF CORRECTION

Patent No. 2,798,286                                        July 9, 1957

Carl R. Anderson

It is hereby certified that error appears in the printed specification of the above numbered patent requiring correction and that the said Letters Patent should read as corrected below.

Column 1, line 18, for "Serial No. 297,292" read -- Serial No. 279,292 --; column 7, line 14, for "edge" read -- edges --.

Signed and sealed this 20th day of August 1957.

(SEAL)
Attest:
KARL H. AXLINE
Attesting Officer

ROBERT C. WATSON
Commissioner of Patents